United States Patent

[11] 3,625,633

| | | |
|---|---|---|
| [72] | Inventor | Thomas F. Nelson<br>Stratford, Conn. |
| [21] | Appl. No. | 860,322 |
| [22] | Filed | Sept. 23, 1969 |
| [45] | Patented | Dec. 7, 1971 |
| [73] | Assignee | General Electric Company |

[54] CLUTCH ASSEMBLY FOR COUPLING MECHANISMS
11 Claims, 4 Drawing Figs.

[52] U.S. Cl. ..................................................... 416/169,
416/100, 192/94
[51] Int. Cl. .................................................... F04d 25/10,
F16d 19/00
[50] Field of Search ........................................... 192/20, 53,
66, 70.22, 70.23, 94, 95; 416/169, 100

[56] References Cited
UNITED STATES PATENTS
| | | | |
|---|---|---|---|
| 1,157,408 | 10/1915 | Master ......................... | 192/94 |
| 2,253,127 | 8/1941 | Koch ........................... | 416/100 |

*Primary Examiner*—Martin P. Schwadron
*Assistant Examiner*—Clemens Schimikowski
*Attorneys*—Lawrence R. Kempton, Leonard J. Platt, Frederick P. Weidner, Frank L. Neuhauser, Oscar B. Waddell and Joseph B. Forman ABSTRACT: A clutch assembly for a coupling mechanism between a constantly rotating driving gear and a gear to be driven. The assembly includes a worm wheel rotatable about an axle and transversely shiftable with respect to the axle. A coupler disc is provided that is rotatable with the worm wheel. A sloppy fit between the worm wheel and coupler disc allows lateral movement with respect to each other. The assembly also includes means, such as a movable pressure plate, to engage the coupler disc and the gear to be driven.

PATENTED DEC 7 1971 3,625,633

Inventor:
Thomas F. Nelson by Frederick A. Weidner, Jr.
Attorney

CLUTCH ASSEMBLY FOR COUPLING MECHANISMS

BACKGROUND OF THE INVENTION

1. Field of the Invention

This invention relates to a manually actuated clutch assembly for use in a coupling mechanism. The invention is particularly adapted for coupling mechanisms used for driving an oscillating mechanism such as employed in oscillating fans.

2. Description of the Prior Art

Oscillating electric fans have been well known for many years. Such fans normally have a pedestal or base upon which is mounted a fan unit with an electric motor and fan blade assembly driven by the motor shaft. For oscillating the fan through a predetermined angular movement about its base, a mechanism comprising gearing connected to the motor shaft is commonly used to effect the oscillating movement. While oscillating fans have a distinct purpose in circulating the air within a room, it is desirable, under some circumstances, to stop the cyclic oscillating of the fan and to position it in such a manner that it will force an airstream in but one direction. Oscillating fans have, therefore, customarily employed a clutch assembly which will engage or disengage the oscillating mechanism from the constantly rotating motor shaft that drives the oscillating mechanism. U.S. Pat. Nos. 2,253,127; 2,341,220; and 2,597,034 are examples of prior patents that disclose this type of fan and also various clutch arrangements used heretofore for oscillating such fans.

It is highly desirable to have a clutch assembly which will permit the user to manually engage or disengage the oscillating mechanism while the fan is operating. One clutch assembly commonly used includes a worm wheel which is constantly driven by a worm gear cut into the motor shaft. The worm wheel is mounted so that it rotates about a pinion gear which is geared to an oscillating mechanism. In the nonoscillating mode, the worm wheel is free to rotate relative to the pinion gear. In the oscillating mode, the pinion gear must be rotated. To rotate the pinion gear, the worm wheel is caused to frictionally engage the pinion gear by screwing down an overlying pressure plate, thereby pressing the worm wheel against the pinion gear in a driving relationship. Such a clutching arrangement, however, has caused some difficulty in that it is frequently possible for the worm wheel to be locked into engagement with the pinion gear such that its position relative to the axis about which it rotates produces eccentric rotation of the worm wheel. Because the teeth of the worm wheel mesh with the worm gear cut in the motor shaft, the eccentric rotation of the worm wheel in many cases can be sufficient to detrimentally affect the operation of the fan. The binding between the worm wheel and worm gear will often affect the speed of rotation of the motor shaft so that during oscillating the speed of the fan is increased and decreased periodically. In some instances, the restrictive force placed upon the motor shaft by the eccentric rotation of the worm wheel will stall the motor. The same detrimental effect can also result from misalignment of the various components comprising the coupling mechanism between the motor shaft and the oscillating mechanism even though the worm wheel itself rotates concentrically. By my invention, there is provided a clutch assembly for use in driving a mechanism, such as an oscillating mechanism for fans, which will compensate for the aforementioned difficulties.

SUMMARY OF THE INVENTION

In accordance with this invention, there is provided a manually actuated clutch assembly for use particularly in oscillating fans, including a gear to be driven, a rotatable worm wheel, a coupler disc and means to drivingly engage the coupler disc and gear. The worm wheel is constantly rotating about an axle and is transversely movable or shiftable with respect to the axle. The coupler disc is rotatably driven by the worm wheel and the worm wheel and coupler disc are adapted to be laterally movable with respect to each other. Means to drivingly engage the coupler disc and gear, such as a pressure plate overlying the coupler disc, is arranged and adapted to selectively engage the coupler disc and cause the coupler disc to drive the gear.

By this clutch assembly, the constantly rotating worm wheel imparts rotational movement to the coupler disc which in turn drives the gear when the pressure plate and coupler disc are engaged. With the worm wheel capable of shifting transversely to the axle about which it rotates and the worm wheel and coupler disc movable laterally with respect to each other, the clutch assembly can, if need be, continually adjust itself to compensate for any misalignment or eccentricity existing in the driving elements while the gear is being driven.

It is an object of this invention to provide a new and improved clutch assembly for a coupling mechanism.

It is a further object of this invention to provide a new and improved clutch assembly that is readily adaptable to drive mechanisms and particularly oscillating mechanisms used in oscillating fans.

DESCRIPTION OF THE PREFERRED EMBODIMENT

Figure 1:
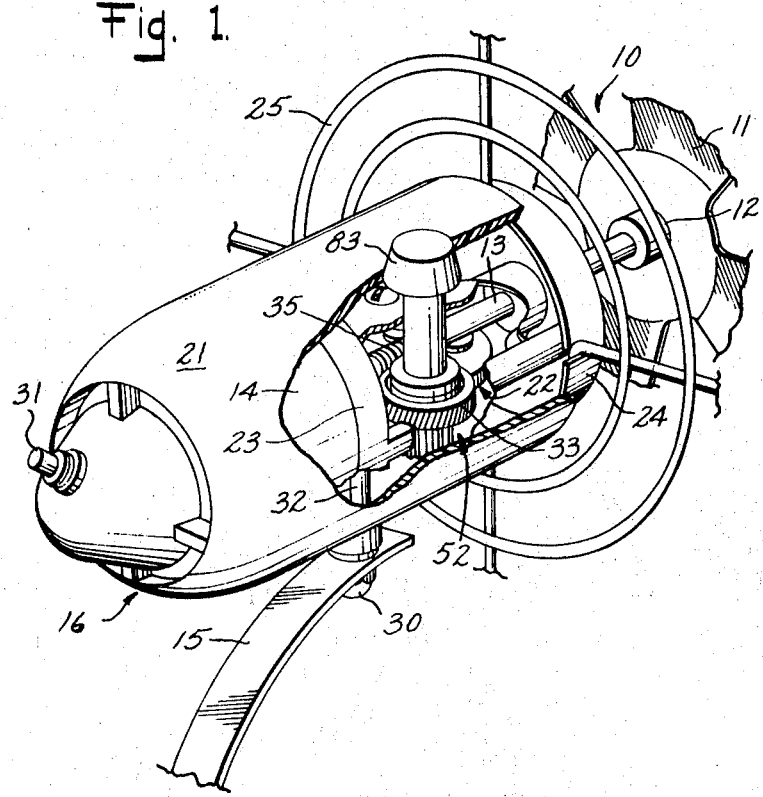
FIG. 1 is a partial sectional cutaway view of an oscillating fan embodying my clutch assembly.

With particular reference to the drawings, there is illustrated in FIG. 1 an oscillating fan incorporating the clutch assembly of my invention. The fan unit 16, as shown, includes a blade assembly 10 which consists of a plurality of fan blades 11 attached to a hub 12. The blade assembly is carried by the rotatable shaft 13 of an electric motor 14. Support for the fan unit 16 is usually provided by a pedestal or base (not shown) with an arcuate shaped bracket 15 connecting the base to the fan unit 16. The fan unit 16 is secured to the bracket 15 in such a manner that the fan unit is permitted to oscillate from side to side through a predetermined angle while the base and bracket 15 remain stationary. The fan unit 16 also includes an oscillating mechanism 22 contained within a gear case and motor frame housing 23. A cover 21 and an end cap 24 carrying a fan blade guard 25 are provided for enclosing the motor, gear mechanism, and associated components. Switch 31, accessible to the user from outside the fan cover 21 is provided for controlling energization of the motor 14 to operate the fan.

Figure 2:
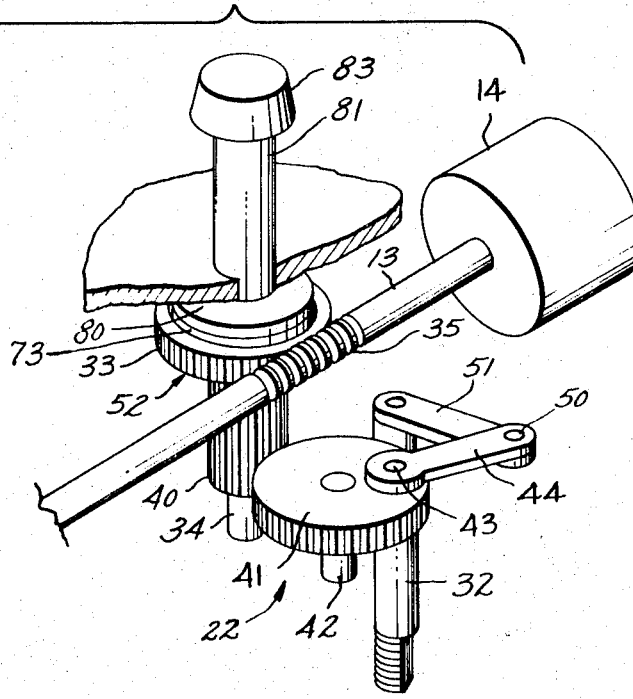
FIG. 2 is a diagrammatic view of the clutch assembly in driving relationship with an oscillating mechanism.

The oscillating mechanism 22, shown in FIG. 2 diagrammatically and in FIG. 1 in its relationship to the overall fan unit, is a well known and commonly used type for oscillating fans. A gear wheel 41 is rotatably mounted on pin 42 fixed or set into the fan housing 23. A pivot pin 43 is positioned on gear wheel 41 at a convenient distance from the center thereof. One end of crank arm 44 is attached to pivot pin 43 and the other end is attached to hinge pin 50. Attached also to hinge pin 50 is arm 51 that has its opposite end fixed to swivel stud 32. When gear wheel 41 is rotated carrying with it pivot pin 43, crank arm 44 moves hinge pin 50 back and forth along an arcuate path. With arm 51 securely fixed to the swivel stud 32, the arcuate movement applied to the end of arm 51 attached to hinge pin 50 is imparted to the swivel stud. By attaching swivel stud 32 to bracket 15 in such a manner that it cannot turn in the bracket, the entire fan unit 16, which is supported on the swivel stud, is oscillated when the swivel stud is oscillated. While other types of mechanisms for imparting oscillatory movements may be employed, the above-described mechanism is widely used because of its simplicity and reliability.

To rotate gear wheel 41, the following gear arrangement may be used. A pinion gear 40 is rotatably mounted on upstanding pin 34 fixed or set into the fan housing 23 in a position such that the teeth of the pinion gear mesh with the teeth of gear wheel 41. Mounted also on pin 34 above the pinion gear is worm wheel 33 that meshes with worm gear 35 cut into motor shaft 13. A manually engageable clutching arrangement, which will be described in detail later, allows the worm wheel to drivingly engage the pinion gear at the user's option. When the pinion gear is engaged, shaft 13 rotates to drive the above-described gear train, and through appropriate gear reduction, gear wheel 41 of the oscillating mechanism is caused to rotate at the desired speed.

Figure 3:
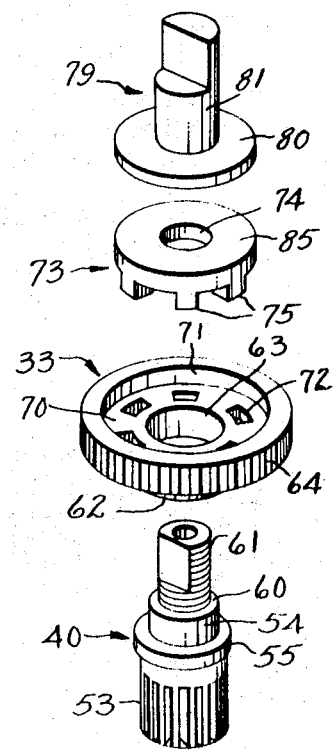
FIG. 3 is an exploded view of the component parts of my clutch assembly.

The present invention is directed to a clutch assembly 52 which when engaged will transmit rotational movement from the worm wheel 33 to the pinion gear 40 that drives the oscillating mechanism 22. With particular reference to FIG. 3, the clutch assembly is shown in an exploded view so that the individual component parts may be easily seen. The pinion gear 40 has gear teeth 53 at one end thereof for meshing the gear wheel 41 of the oscillating mechanism. At the opposite end of the pinion gear from the gear teeth, there is a cylindrical collar 54 separated from the gear teeth portion by a radially outwardly projecting flange 55. At the top of collar 54 is an inwardly directed shoulder 60 which terminates in abutment with an externally threaded shank 61.

The worm wheel 33 is transverse to the longitudinal axis of pinion gear 40 and has a downwardly extending hub 62 with a central bore 63 for receiving therein pinion collar 54 which acts as the axle for the worm wheel. The bore 63 has a slightly larger inside diameter than pinion collar 54 so that the worm wheel is transversely movable with respect to the collar and may be freely rotated about the collar. The face 70 of the worm wheel is the web portion of the wheel between hub bore 63 and the circumferential outer periphery of the worm wheel. The upper portion of the worm wheel is recessed, thus providing a depending vertical wall 71 that joins face 70. The circumferential outer periphery of the worm wheel carries gear teeth 64 which mesh with worm gear 35 as previously described. A plurality of cavities 72 in the worm wheel face 70, which may or may not extend completely through the face, are spaced radially outwardly from hub bore 63 between hub bore 63 and vertical wall 71. Overlying worm wheel face 70 is coupler disc 73 with circular aperture 74 in the center thereof and a plurality of downwardly directed projecting elements 75 spaced around its periphery. The aperture 74 has an inside diameter larger than the diameter of the threaded shank 61 of the pinion gear, but smaller than the outside diameter of collar 54. With the coupler disc having this size aperture, the disc will fit over the threaded shank 61 and be supported upon shoulder 60 on top of the collar. The diameter of the circular body of coupler disc 73 is smaller than the diameter of the recessed worm wheel face 70 so that it is received when assembled within the recess and the worm wheel may be moved laterally with respect to the coupler disc. The downwardly directed projecting elements 75 correspond in number to the number of cavities 72 provided in the worm wheel face. Above the coupler disc 73 is an axially movable pressure plate 79 which is generally hat-shaped with flange 80 extending radially outwardly from stem portion 81. Pressure plate stem portion 81 has an inside threaded bore 82 (FIG. 4) for threadingly engaging complementary threaded shank 61 of the pinion gear. For convenient manual operation of the pressure plate, a knob 83, such as shown in FIGS. 1 and 2, may be attached to pressure plate stem portion 81.

Figure 4:
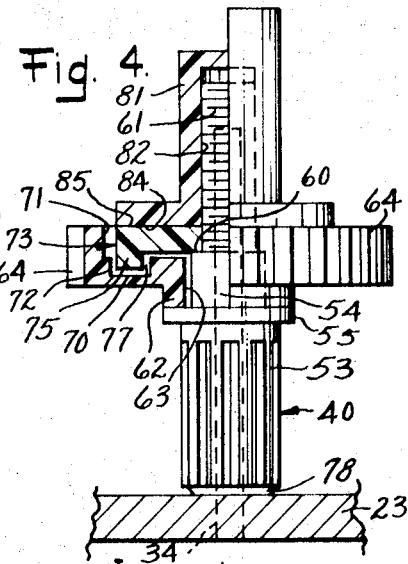
FIG. 4 is a partial sectional view of the clutch assembly.

FIG. 4 of the drawings shows the components of the clutch assembly 52 assembled with a portion of the assembly shown in cross section. Pin 34 is securely fastened or set into the fan housing 23 with pinion gear 40 axially placed on pin 34 so that it freely rotates about the pin with bearing portion 78 thereof resting on fan housing 23. Hub bore 63 of the worm wheel, which has a greater diameter than pinion collar 54, fits over the pinion collar with hub 62 supported on the top surface of pinion gear flange 55. The worm wheel is free to rotate with respect to the pinion gear about the collar and is transversely shiftable with respect to the collar. The coupler disc 73 is positioned within the recess of the worm wheel face 70 and is supported a fixed distance above the worm wheel by pinion shoulder 60. The dimensions of the projecting elements 75 are slightly smaller than the dimensions of the cavities 72 so that each projecting element will be received within a cavity and have some clearance or space 77 to provide a sloppy fit. The sloppy fit should be such that the worm wheel may be moved within tolerable limits laterally in all directions relative to the coupler disc. The projecting elements 75 and cavities 72 may have various shapes, however, I have found that a generally rectangular shape curved for spaced arrangement around either aperture 74 of coupler disc 73 or bore 63 of worm wheel 33, as the case may be, works quite satisfactorily. Although the drawings show six projecting elements and cavities, the number can vary and, if desired, there may only be one cavity and projecting element. With a plurality of projecting elements, preferably three to six, and the above-mentioned configuration and arrangement, the applied forces are distributed among the projecting elements thereby enhancing the wear qualities and functionality of the clutch assembly.

The pressure plate 79 is threaded onto shank 61 of the pinion gear and may be moved axially by manual rotation. When pressure plate 79 is rotated clockwise it advances toward the coupler disc 73 until the bottom surface 84 of flange 80 engages upper surface 85 of coupler disc 73 in pressure applying contact. When pressure is applied in this manner to the coupler disc, the coupler disc frictionally engages shoulder 60 of pinion gear 40. It should be noted that worm wheel 33 does not frictionally engage the pinion gear but rather it is the coupler disc that performs this function. To disengage the pressure plate from the coupler disc, the pressure plate is rotated counterclockwise thereby backing it away from the coupler disc 73 up the pinion gear shank 61.

The manner in which the coupling mechanism operates with the above-described clutch assembly to provide oscillatory movement of the fan unit is as follows: When the motor 14 is energized by switch 31, the motor shaft 13 carrying worm gear 35 is rotated. Worm wheel 33 meshes with and is in continuous driven relationship with worm gear 35 during operation of the fan. While the fan is operating in the nonoscillating mode, worm wheel 33 rotates freely about pinion collar 54 and no rotary motion is imparted to the pinion gear to drive the oscillating mechanism. For oscillation, the user turns knob 83 clockwise to advance pressure plate 79 toward and engage coupler disc 73 in pressure applying contact which, in turn, causes the coupler disc to be urged into pressure applying contact with shoulder 60 of the pinion gear. The rotational movement of worm wheel 33 is transmitted to coupler disc 73 through projecting elements 75 and this rotational movement is transmitted by coupler disc 73 to pinion gear 40 causing it to rotate. With pinion gear 40 meshing with gear 41 of the oscillating mechanism, the rotation of the pinion gear now effects operation of the oscillating mechanism and causes the fan to oscillate from side to side through a predetermined angle as previously described. Since worm wheel 33 does not itself frictionally engage the pinion gear but rather the coupler disc does and the worm wheel is transversely shiftable with respect to its axle plus the sloppy fit provided between the worm wheel and the coupler disc permitting lateral movement of the worm wheel relative to the coupler disc, the worm wheel is freely shiftable within the structural limits built into the assembly. Any eccentric rotation of the worm wheel or misalignment of the various components of the coupling mechanism will be compensated for by this arrangement.

While there has been shown and described a particular embodiment of the present invention, it will be apparent to those skilled in the art that various changes and modifications may be made without departing from the invention, and it is, therefore, contemplated in the appended claims to cover changes and modifications that fall within the true spirit and scope of the present invention.

I claim:

1. A clutch assembly comprising:

a. a gear, b. a driven worm wheel rotatable about an axle and transversely shiftable with respect to the axle,
c. a coupler disc rotatably driven at all times by the worm wheel, said worm wheel and coupler disc adapted to be at all times laterally movable with respect to each other in a plane perpendicular to the axle, and
d. means to drivingly engage the coupler disc and gear.

2. The clutch assembly of claim 1 wherein the means to drivingly engage the coupler disc and gear is a pressure plate which is adapted to engage the coupler disc and cause it to engage said gear.

3. The clutch assembly of claim 1 wherein the face of said worm wheel has a cavity and the coupler disc has a projecting element extending into and slightly smaller than said worm wheel cavity.

4. The clutch assembly of claim 2 wherein the gear is a pinion gear having a shoulder at one end thereof that carries the coupler disc.

5. The clutch assembly of claim 3 wherein a plurality of cavities are spaced around the worm wheel face and a plurality of projecting elements slightly smaller than the respective cavities are spaced around the coupler disc.

6. The clutch assembly of claim 4 wherein the pinion gear has an externally threaded portion above said shoulder and the pressure plate is threadedly connected to said portion to permit manual, frictional engagement between the pressure plate and coupler disc and between the coupler disc and pinion gear shoulder to drive the pinion gear in response to rotation of the coupler disc.

7. In an oscillating fan having a base, a fan housing supported by the base, a motor within said housing, a rotatable shaft driven by said motor, a blade assembly secured to said shaft and a mechanism to oscillate said fan housing through a predetermined angle driven by the rotating shaft through a clutch assembly, said clutch assembly comprising:
a. a gear for driving said oscillating mechanism,
b. a worm wheel driven by the shaft and rotatable about an axle, said worm wheel being transversely shiftable with respect to the axle,
c. a coupler disc rotatably driven at all times by the worm wheel, said worm wheel and coupler disc adapted to be at all times laterally movable with respect to each other in a plane perpendicular to the axle, and
d. means to drivingly engage the coupler disc and said gear.

8. The oscillating fan of claim 7 wherein the gear is a pinion gear with a shoulder at one end thereof that carries the coupler disc.

9. The oscillating fan of claim 7 wherein the face of said worm wheel has a cavity and the coupler disc has a projecting element extending into and slightly smaller than said worm wheel cavity.

10. The oscillating fan of claim 8 wherein the means to engage the coupler disc and said pinion gear is a pressure plate adapted to engage the coupler disc and cause it to frictionally engage the pinion gear shoulder to drive the pinion gear in response to rotation of the coupler disc.

11. The oscillating fan of claim 9 wherein the coupler disc and worm wheel have a plurality of spaced projecting elements and cavities respectively, said coupler disc being driven only through the engagement between the projecting elements and worm wheel cavities.

* * * * *